United States Patent
Kaneski et al.

[19]

[11] Patent Number: 6,077,354
[45] Date of Patent: Jun. 20, 2000

[54] VEHICLE PAINTING SYSTEM HAVING A PAINT RECOVERY MECHANISM

[75] Inventors: Donald E. Kaneski, Fenton; David R. Powell, Kirkwood, both of Mo.

[73] Assignee: Chrysler Corporation, Auburn Hills, Mich.

[21] Appl. No.: 09/167,841

[22] Filed: Oct. 7, 1998

[51] Int. Cl.[7] .................................................. B05C 11/10
[52] U.S. Cl. ........................... 118/664; 118/676; 118/688
[58] Field of Search ..................................... 118/664, 676, 118/688, 689, 602, 603; 427/345; 134/18, 166 R, 169 C

[56] References Cited

U.S. PATENT DOCUMENTS 4,491,009  1/1985  Ruesch .......................................... 73/32
4,798,341  1/1989  Gimple ....................................... 239/694

Primary Examiner—Richard Crispino
Assistant Examiner—George R Koch, III
Attorney, Agent, or Firm—Lawrence J. Shurupoff

[57] ABSTRACT

An automotive vehicle body painting system can be equipped with a paint purge mechanism that includes a densitometer responsive to density changes in the fluid flowing through the mechanism. The densitometer can be used to selectively direct pure paint into a pure paint collection receptacle or a solvent-paint solution into a mixed paint collection receptacle. The system achieves a relatively high percentage recovery of pure paint that is purged from the painting system during each paint color change.

14 Claims, 3 Drawing Sheets

(PAINT APPLICATION MODE)

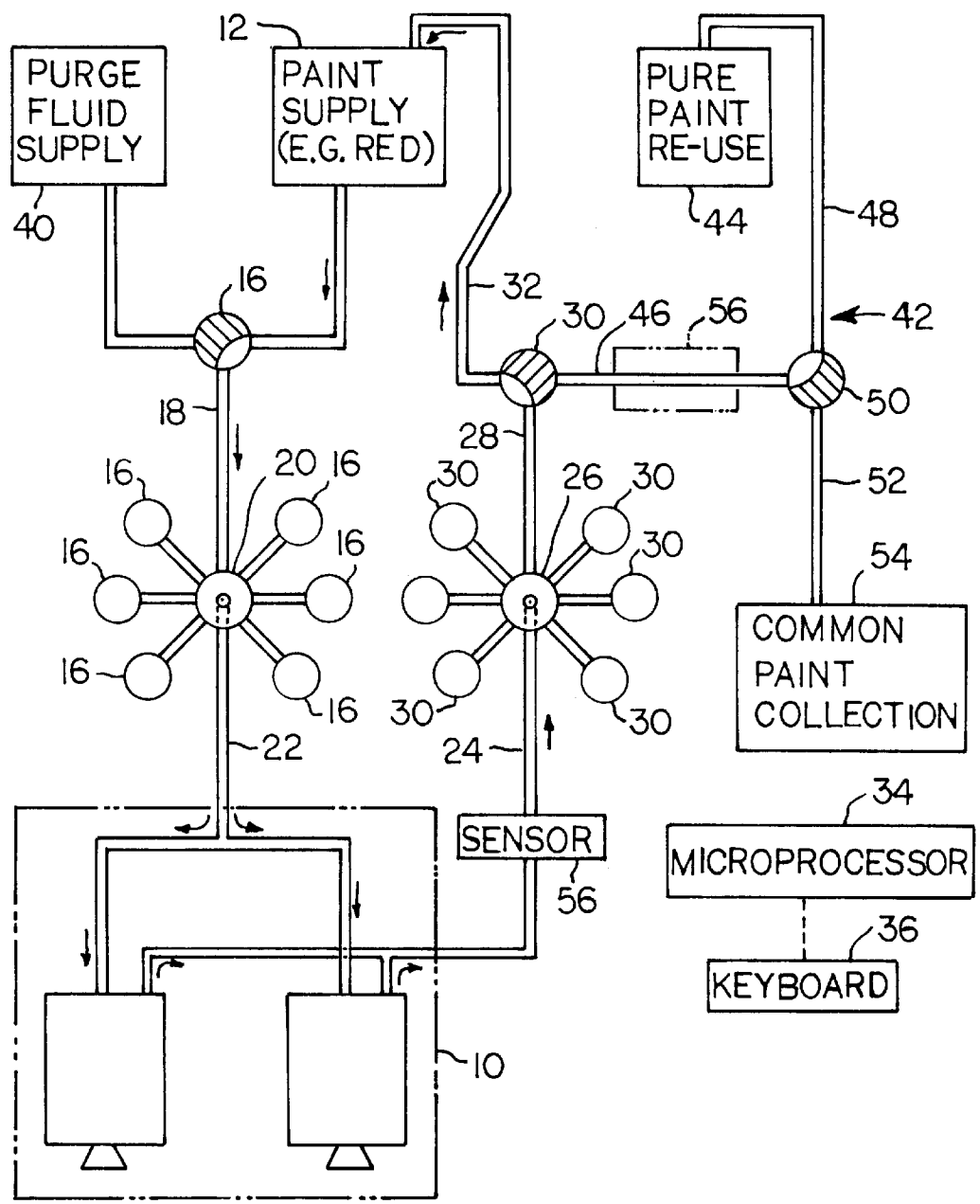
FIG. 1 (PAINT APPLICATION MODE)

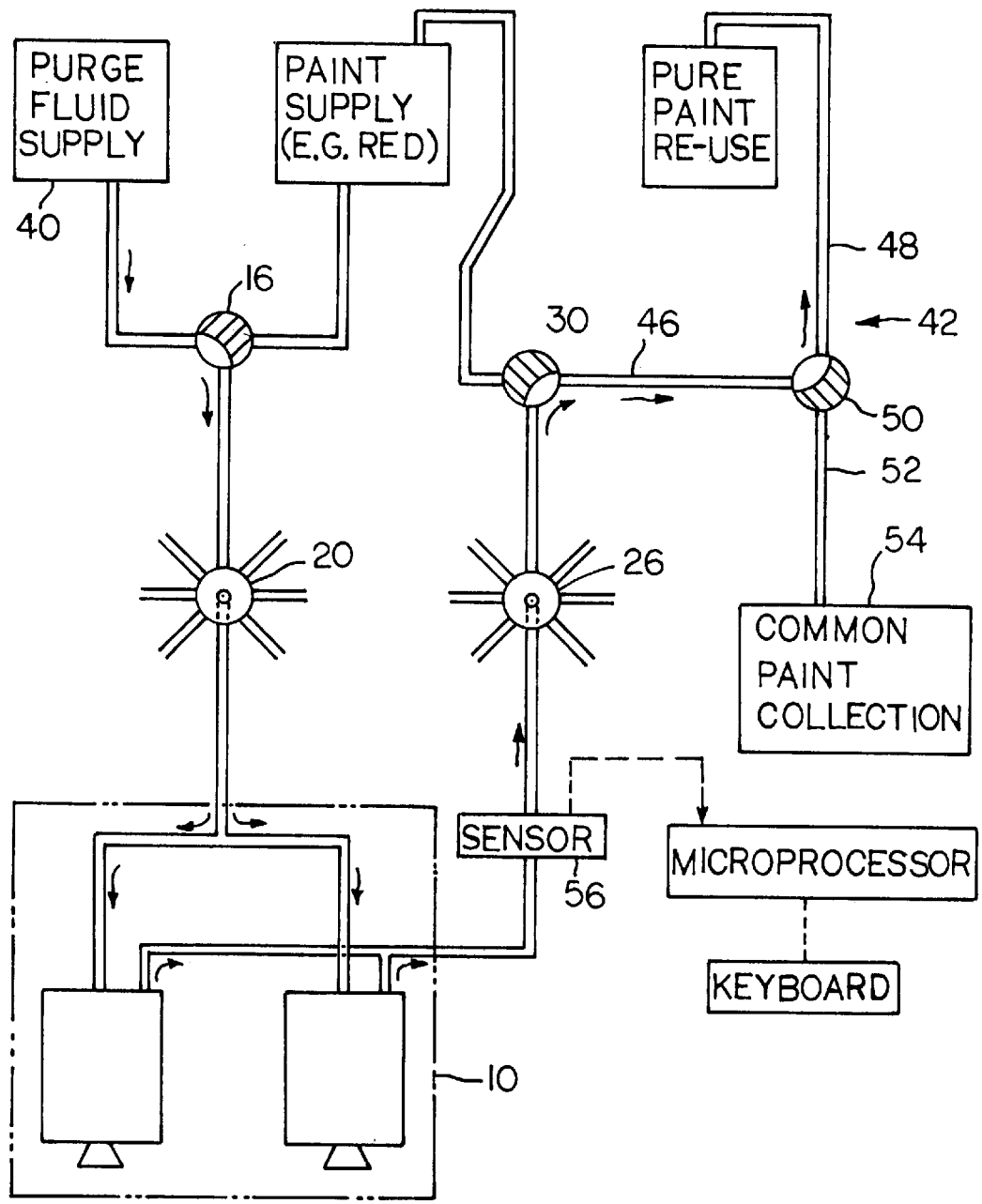
FIG 2 (PURGE-INITIAL STAGE)

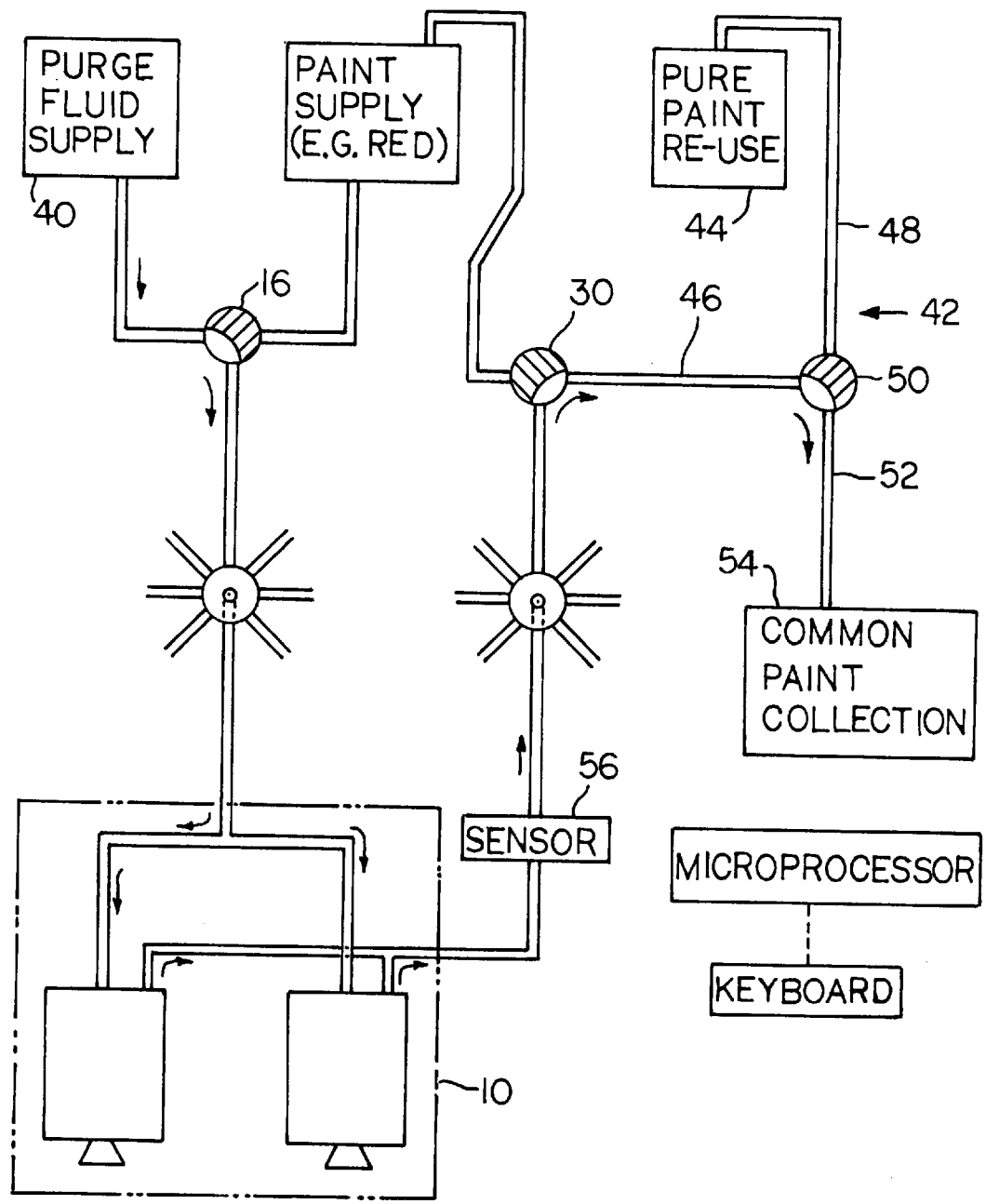
FIG. 3 (PURGE-FINAL STAGE)

VEHICLE PAINTING SYSTEM HAVING A PAINT RECOVERY MECHANISM

BACKGROUND OF THE INVENTION

1. Field of Invention

This invention relates to a vehicle body painting system having a paint recovery sub-system for minimizing the paint requirements.

2. Description of Prior Developments

In conventional automotive vehicle manufacture the vehicle bodies are painted in a tunnel-type paint booth. Typically, the bodies are placed on a conveyor that moves slowly through different chambers in an elongated tunnel. As each vehicle moves slowly along the tunnel, different painting operations and drying operations are performed on different surfaces of the vehicle.

Different paint colors are applied to the different vehicle bodies, depending on production requirements. Periodically, it is necessary to change the paint coloration supplied to the paint applicator mechanisms, e.g. when one vehicle is to have a blue coloration and the next vehicle body is to have a red coloration.

When it is necessary to change the paint coloration supplied to the paint applicator mechanisms, a paint solvent is passed through the paint supply passages, paint applicator mechanisms, and paint return passages. The solvent initially acts as a pump to move most of the paint out of the passages, and later as a cleaner to dissolve and remove residual paint from the passage walls. The process of removing paint from the various passages is sometimes referred to as the purge cycle. Typically the purge cycle takes about fifteen seconds. The purge cycle takes place without stopping the conveyor. The vehicle bodies continually move through the paint booth tunnel during the purge cycle and during the time required to load the new paint coloration into the various passages.

Under conventional practice, paint purged from the painting mechanism is sent to a common paint collection receptacle. Over time paint colorations of various hues and shades are comingled so as to be unusable. A typical painting system may have about ten different paint colorations. Mixing ten different colors produces a substantially unusable paint coloration.

U.S. Pat. No. 3,348,774, issued to R. Wiggins, discloses a painting system, wherein the paint coloration change cycle includes a purge action that reclaims some of the purged paint in a relatively pure condition. The patent shows a pure paint reclaim container and a separate common paint disposal container having a branched connection to a purge line so that during the initial stage of the purge cycle paint is directed to the reclaim container and during the later stage paint is sent to the common disposal container. The patent does not disclose how the paint path is switched or redirected.

SUMMARY OF THE INVENTION

The present invention is concerned with a paint recovery system wherein valves are provided for switching paint flow from a pure paint collection receptacle to a common multicolor collection receptacle, as a function of the flow of purge fluid solvent through the system. During the initial period when the purge fluid is acting as a pump to move pure paint into the paint recovery system, the paint is directed into the pure paint collection receptacle. When the purge fluid is functioning as a cleaner for removing residual paint from the passage surfaces, a valve in the paint-purge fluid solution flow path directs the purged fluid into the common collection receptacle.

A sensor, operable to distinguish flowing paint from flowing solution, is used to control the various valves in the paint recovery system. The sensor can be a densitometer sensitive to density differences between pure paint and paint solvent solutions. The sensor provides a positive indication of a change in flow from pure paint to paint solvent solution, whereby the flow-directing valves are enabled to direct pure paint into the pure paint collection receptacle and paint-solvent solution into the common collection receptacle. The invention enables a relatively high percentage of the paint to be collected in a pure state, for later reuse.

Further features of the invention will be apparent from the attached drawings and description of an illustrative embodiment of the invention.

BRIEF DESCRIPTION OF THE DRAWINGS

FIG. 1 is a schematic drawing of a vehicle painting system that utilizes the present invention.

FIG. 2 shows the FIG. 1 system during the initial stage of a paint purge cycle.

FIG. 3 shows the FIG. 1 system during the final stage of a paint purge cycle.

DESCRIPTION OF A PREFERRED EMBODIMENT OF THE INVENTION

FIG. 1 schematically shows an automotive vehicle painting system that includes a paint applicator mechanism 10 adapted to be supplied with pressurized paint of various colorations, depending on the particular color required for any given vehicle. As shown in FIG. 1, a representative pressurized paint source 12 is connected to paint applicator mechanism 10 through a passage system that includes passage 14, valve 16, passage 18, manifold 20, and passage 22. Unused (excess) paint is returned to paint source 12 through a passage system that includes a passage 24, manifold 26, passage 28, valve 30, and passage 32.

Paint applicator mechanism 10 can include a combination of different paint applicator devices, e.g. electrostatic paint spray mechanisms, robotic spray mechanisms or manual spray guns, located in various chambers along the painting booth (tunnel) that is used to house the vehicle bodies being painted. The vehicle bodies are usually supported on a continuously moving conveyor that extends through the tunnel. Various different painting operations are performed in different chambers within the tunnel as each vehicle body is moved along the tunnel.

As shown in FIG. 1, manifold 20 has connections to seven paint supply passages, each equipped with a control valve 16. Each paint supply passage is connected to a different colored paint, e.g. blue, or green, or yellow. Similarly, the paint return manifold 26 is connected to seven different paint return passages, each equipped with a control valve 30. Only one supply valve 16-return valve 30 combination is connected to the associated paint source at any one time. The other six supply valve 16 return valve 30 combinations are closed to paint flow.

The valves 16 and 30 are controlled by a microprocessor 34 equipped with a keyboard 36. A human technician stationed near the entrance end of the paint booth is provided with information on the color that is to be used for each particular vehicle body entering the booth. The appropriate information is punched into the computer via keyboard 36, so that when the particular vehicle body is in the booth, the correct color paint will have been loaded into the paint applicator mechanism. Microprocessor 34 controls the various valves 16 and 30 to provide the correct color paint in applicator mechanism 10. Different color paints may be supplied to different paint applicators stationed along the tunnel in accordance with the particular vehicle body being worked on. For example, a vehicle body near the exit end of the tunnel may be painted red while at the same time a vehicle body near the entrance end of the tunnel may be painted blue. Microprocessor 34 is programmed to make the correct paint coloration decision for each paint applicator system in the tunnel. The drawing shows one paint applicator system.

Paint color changes have to be made by the microprocessor in accordance with the progress of different vehicle bodies into and through the tunnel. Such color changes require that applicator mechanism 10 and the two manifolds 20 and 26 be purged of the paint coloration used for the proceeding vehicle body, in order that the new paint coloration be loaded into the paint applicator mechanism within a suitable time period, typically about twenty seconds.

In the illustrated painting system, a pressurized paint solvent is circulated through the system to remove paint from the various passage walls. The paint solvent, in liquid or aerated form, is pumped from a purge fluid supply 40 through the system into a paint recovery sub-system referenced generally by numeral 42. FIG. 2 shows the condition of the system during the initial stage of the paint purge cycle. FIG. 3 shows the condition of the system during the final stage of the paint purge cycle.

Paint recovery sub-system 42 comprises a pure paint collection receptacle 44 for each paint colorant (seven paint colorants in the illustrated system) and passages 46 and 48 connecting each receptacle 44 to the respective control valve 30. A diverter valve 50 is located in each passage system 46, 48 for diverting paint away from passage 48 into a passage 52 leading to a common paint collection receptacle 54. There is a single collection receptacle 54 for the entire system. Paints of various colorations are comingled in receptacle 54.

During the initial stage of the purge cycle, the pressurized purge fluid (solvent) acts as a fluid pump to drive paint out of manifold 20, paint applicator mechanism 10 and manifold 26 into the paint recovery sub-system 42. FIG. 2 shows the condition of each valve 16, 30 and 42 during the initial stage of the purge cycle. Pure paint is pumped through passage 48 into pure paint collection receptacle 44.

Purge fluid moves from the operating system (components 20,10,26) into the paint recovery sub-system 42. However, before the purge fluid reaches valve 50, the system is switched to the FIG. 3 condition. As shown in FIG. 3, diverter valve 50 is shifted to the condition wherein the solvent-paint solution is directed into the common paint collection receptacle 54. The arrangement is such that each pure paint collection receptacle 44 receives only pure paint of a specific coloration (e.g. blue or red or green). Paint diluted with solvent is directed to receptacle 54.

The paint recovery sub-system 42 is switched from the FIG. 2 pure paint collection mode to the FIG. 3 solvent-diluted paint collection mode, through the use of a single sensor 56 located between the paint applicator mechanism 10 and manifold 26. Sensor 56 is operable to distinguish flowing paint from flowing purge fluid (or solvent diluted paint).

In preferred practice of the invention, sensor 56 is a densitometer, preferably a vibrating tube densitometer sensitive to variations in density of the fluid flowing through one or more U-shaped densitometer flow tubes. U.S. Pat. No. 4,491,009, issued to J. Ruesch, shows a vibrating tube densitometer that can be used in practice of the present invention.

The densitometer of interest has good sensitivity to variations in density of the fluid flowing through the densitometer tube(s), while being relatively uninfluenced by flow rate variations. In the present invention the solvent (or solvent-paint solution) has a lower density than the pure paint. The densitometer can generate an electrical signal that changes abruptly as the fluid flowing through the densitometer changes from the pure paint to the paint-solvent solution.

The electrical output from the densitometer is applied as an input to microprocessor 34. At the same time, the microprocessor has a stored input signal representative of the paint colorant flowing through the system. These two inputs to the microprocessor enable the microprocessor to switch the appropriate diverter valve 50 from the FIG. 2 condition to the FIG. 3 condition. As noted earlier, the microprocessor also controls the selected valves 16 and 30 to achieve the operating modes depicted in FIGS. 2 and 3. When the passage walls are in a cleaned condition the microprocessor switches the system back to the FIG. 1 operating mode, but conditioned to supply a different paint colorant to the applicator mechanism.

The system is designed so that a purge cycle can be carried out for any of the paint colorants. In each case pure paint of a particular coloration is collected in each respective pure paint collection receptacle, as an incident of the purge process.

In the described system a single densitometer (sensor) 56 is used to control the paint recovery action for all of the paint colorants used in the system. However, it is possible to use a different densitometer for recovery of each paint colorant, e.g. by employing a densitometer in each passage 46, as shown in dashed lines in FIG. 1. The paint recovery action is essentially the same whether a single sensor is used between the paint applicator mechanism and manifold 26, or whether a separate densitometer (sensor) is used in each passage 46.

What is claimed:

1. An automotive vehicle painting system comprising:

plural paint supply sources wherein each source has a different coloration;

a paint applicator mechanism for applying paint from selected ones of said sources to individual vehicles as said vehicles pass sequentially through the system;

means for recirculating unused paint from said paint applicator mechanism to the respective paint supply sources;

a paint purge fluid supply connectable to said paint applicator mechanism during a purge cycle in the time interval between the application of one paint coloration to a vehicle and the application of a different paint coloration to a succeeding vehicle;

a paint recovery sub-system that includes plural pure paint collection receptacles selectively connectable to said recirculating means for receiving pure paint from said paint applicator mechanism when purge fluid is supplied to said applicator mechanism, and a common paint collection receptacle connectable to said recirculating means for comingling unused paints of different colorations;

at least one sensor operable to distinguish flowing paint from flowing purge fluid, each said sensor being located between said paint applicator mechanism and said paint recovery sub-system;

a valve located downstream from each said sensor for selectively directing pure paint into each said pure paint collection receptacle or a purge fluid paint solution into said common receptacle; and each said sensor having an output that is effective to control an associated valve, so that during the initial stage of each purge cycle, pure paint is delivered to the respective pure paint collection receptacle, and during the final stage of each purge cycle a purge fluid paint solution is delivered to said common receptacle.

2. The vehicle painting system of claim 1, wherein each said sensor is a densitometer.

3. The vehicle painting system of claim 1 wherein each said sensor is a vibrating tube densitometer.

4. The vehicle painting system of claim 1 wherein there is a single sensor controlling all said valves.

5. The vehicle painting system of claim 1, and further comprising a microprocessor having a first input representing the paint coloration being applied to each vehicle passing through the system, and a second input representing the condition of each said sensor.

6. The vehicle painting system of claim 5, wherein there is a single sensor controlling all said valves; said microprocessor having an output connected to a selected valve in accordance with the paint coloration represented by said first input to the microprocessor.

7. The vehicle painting system of claim 1, wherein there are plural sensors, one for each valve.

8. The vehicle painting system of claim 1, and further comprising a microprocessor having a first input representing the paint coloration being applied to each vehicle passing through the system, and a second input representing the condition of each said sensor;

said system having plural sensors, one for each valve; said microprocessor having an output connected to a selected valve in accordance with the first and second inputs.

9. The vehicle painting system of claim 1, and further comprising a first manifold located between said plural paint sources and said paint applicator mechanism, whereby different paint colorants can be supplied to said applicator mechanism; said recirculating means comprising a second manifold for selectively returning unused paint from said paint applicator mechanism to individual paint supply sources; said system having a single sensor located between said paint applicator mechanism and said second manifold.

10. The vehicle painting system of claim 9, wherein said single sensor is a densitometer.

11. The vehicle painting system of claim 1, and further comprising a first manifold located between said plural paint sources and said paint applicator mechanism; said recirculating means comprising a second manifold located between said paint applicator mechanism and the individual paint supply sources; said system having plural sensors, one for each valve; each sensor being located between said second manifold and the respective valve associated with the respective sensor.

12. In a vehicle painting system that includes plural paint sources having different colorations, a paint applicator mechanism, a first manifold for supply paint from said selected sources to said applicator mechanism, and a second manifold for returning unused paint from said applicator mechanism selectively to said sources:

a paint recovery sub-system that includes a paint purge fluid source connectable to said first manifold for flowing purge fluid through said paint applicator mechanism and said second manifold; separate pure paint collection receptacles having separate passages connected to said second manifold; a common paint collection receptacle adapted to receive comingled unused paints of different colorations from said second manifold; a separate passage connecting said second manifold to each said pure paint collection receptacle; and a control valve in each said passage; each valve having a first condition wherein pure paint is delivered to the associated pure paint collection receptacle and a second condition wherein a purge fluid paint solution is delivered to the common paint collection receptacle; and sensor means operable to distinguish flowing paint from flowing purge fluid; said sensor means having an output signal for controlling each said valve.

13. The improvement of claim 12, wherein said sensor means comprises a densitometer located between said paint applicator mechanism and said second manifold.

14. The improvement of claim 12, wherein said sensor means comprises a densitometer located in each separate passage.

* * * * *